May 29, 1934.   T. V. STANDIFER ET AL   1,960,718
MECHANICAL STOKER AND DAMPER CONTROL FOR FURNACES
Filed June 24, 1932   7 Sheets-Sheet 1

INVENTORS
Thomas V. Standifer and
Robert L. Hatfield
BY Brown & Seward
ATTORNEYS

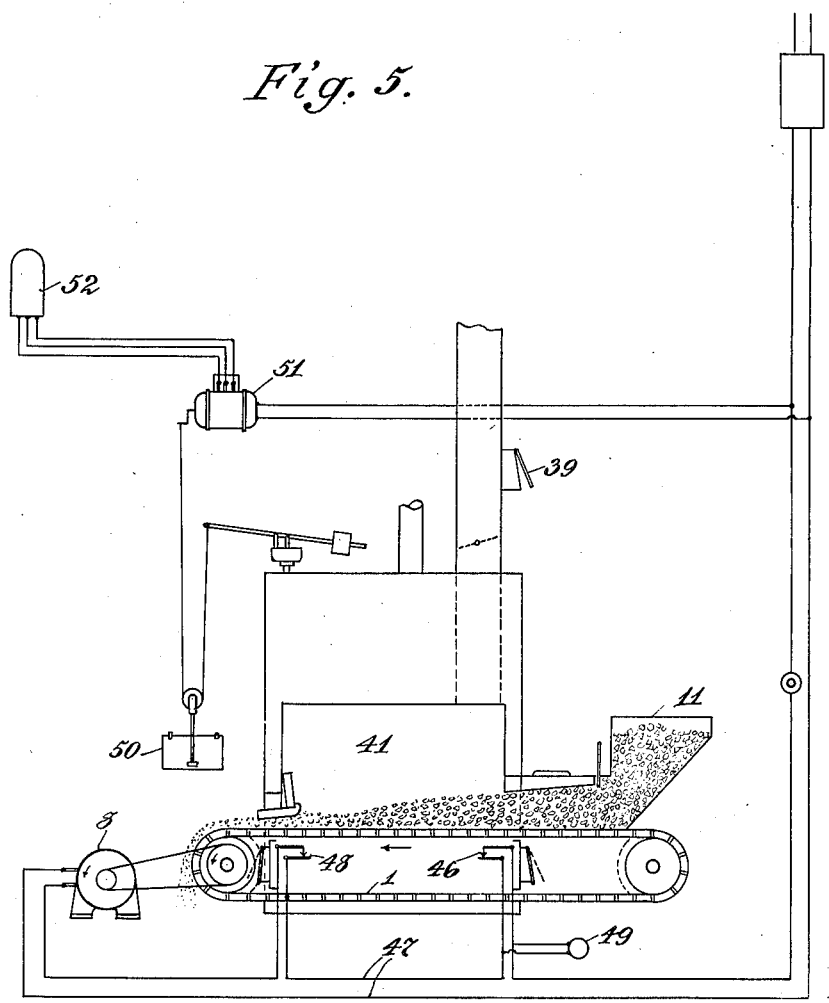

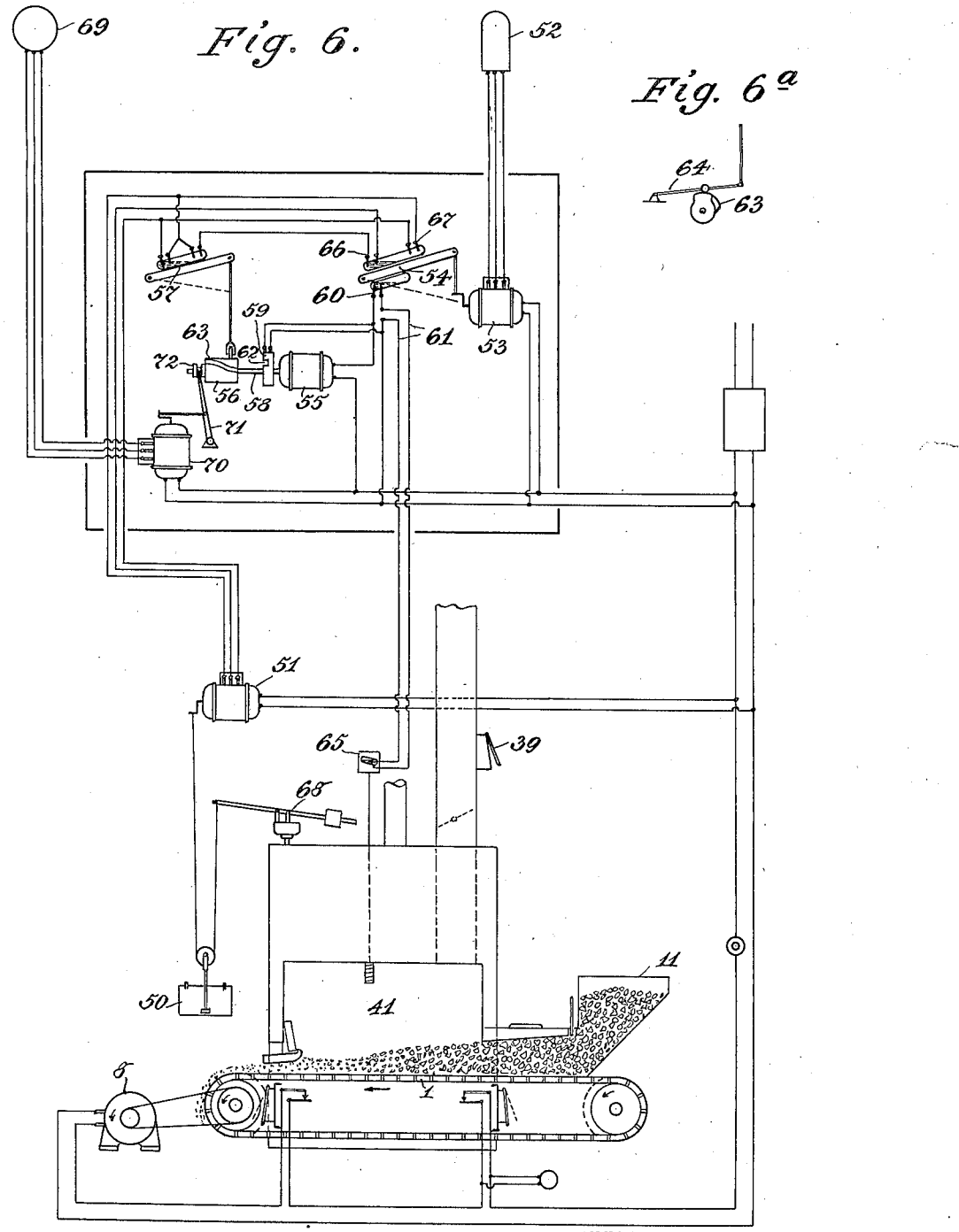

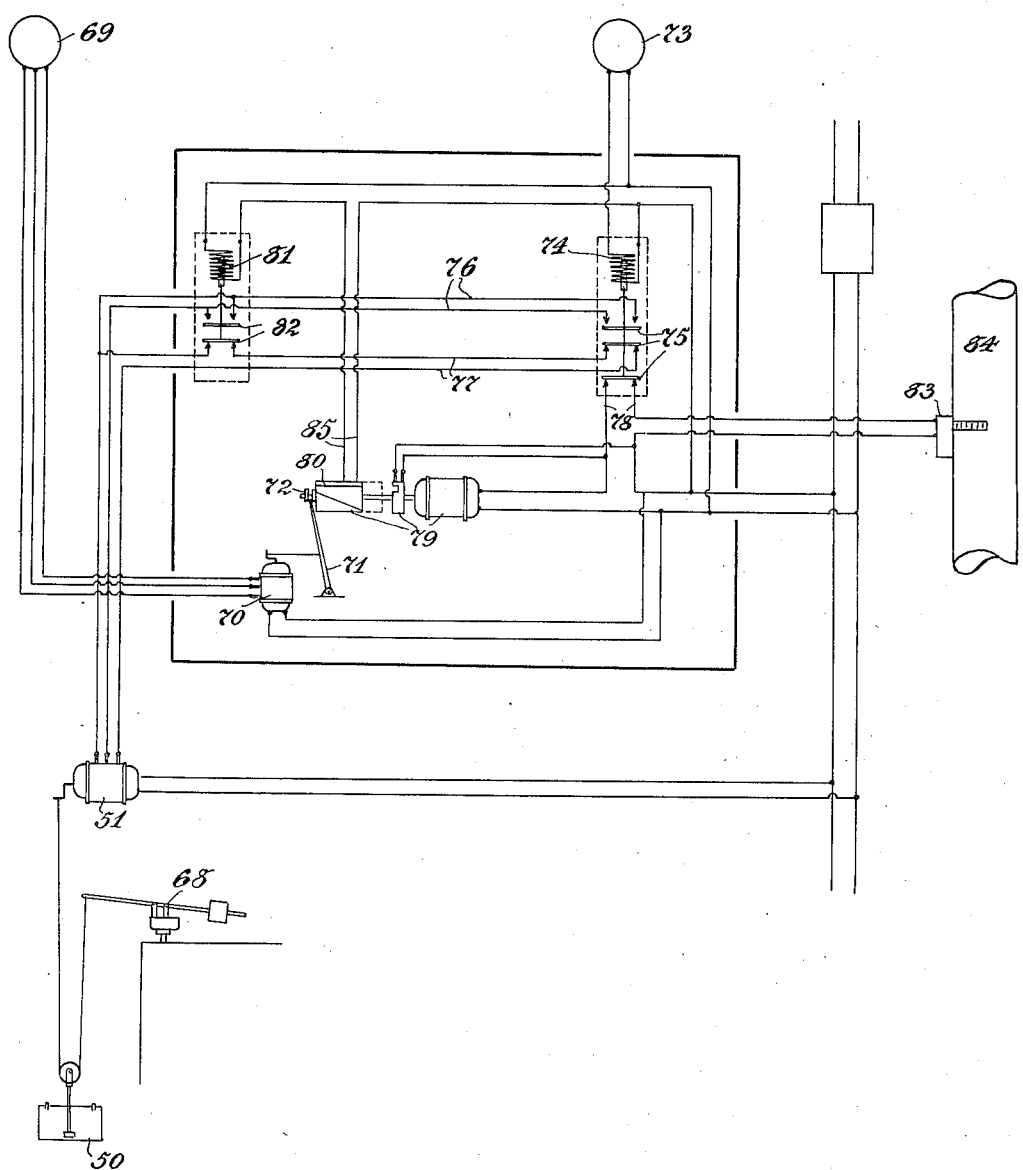

May 29, 1934. T. V. STANDIFER ET AL 1,960,718
MECHANICAL STOKER AND DAMPER CONTROL FOR FURNACES
Filed June 24, 1932 7 Sheets-Sheet 7
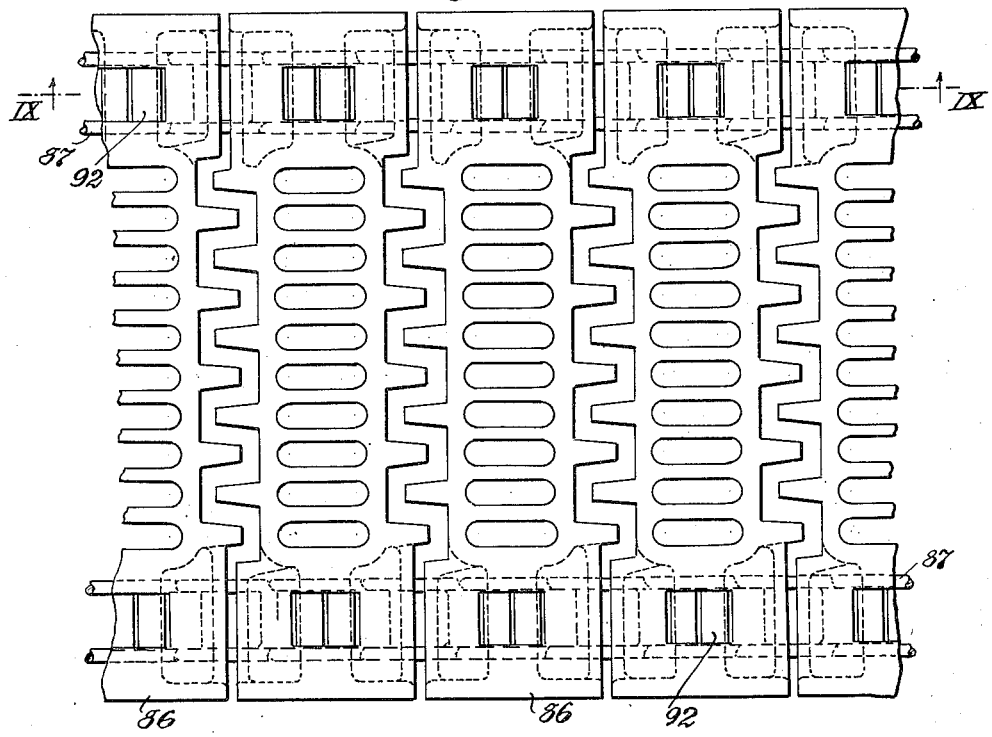
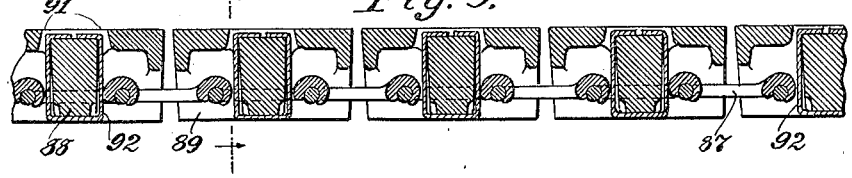
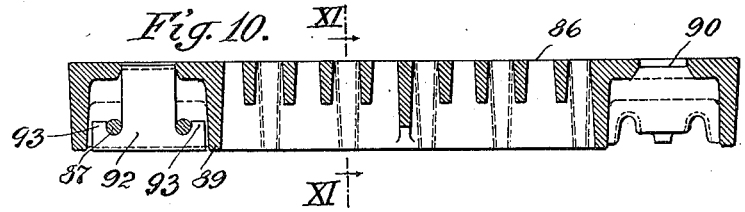
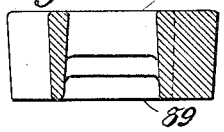
INVENTORS
Thomas V. Standifer and
BY Robert S. Hatfield
Brown & Seward
ATTORNEYS Patented May 29, 1934

1,960,718

UNITED STATES PATENT OFFICE 1,960,718

MECHANICAL STOKER AND DAMPER CONTROL FOR FURNACES

Thomas V. Standifer, Newark, and Robert L. Hatfield, East Orange, N. J.; said Hatfield assignor to said Standifer Application June 24, 1932, Serial No. 619,038

21 Claims. (Cl. 236—9)

This invention relates to a mechanical stoker and damper control for furnaces.

An object of the invention is to provide such a stoker which is adapted for use in connection with ordinary domestic furnaces and with the types of coal normally used therein.

Another object is to provide such a stoker in which the draft control is highly effective and in which the amount of unwanted air is reduced to a minimum.

A further object is to provide means for giving the fuel bed a particular cross-sectional form whereby complete and uniform combustion is facilitated.

Another object is to provide a fire control such that the output of heat will be maintained automatically in proper proportion to the heat demand made at any time upon the furnace of which the stoker is a part.

A further object is to provide means for maintaining a sufficient amount of combustion to prevent extinction of the fire even when little or no demand for heat is being made.

A still further object consists in providing certain improvements in the form, construction and arrangement of the several parts whereby the above named and other objects may effectively be attained.

A practical embodiment of this invention is shown in the accompanying drawings, in which Fig. 1 represents a vertical longitudinal section taken along the center line of the stoker;

Fig. 5 represents diagramatically a simple wiring circuit for controlling the operation of the grate and furnace;

Fig. 6 represents diagrammatically another circuit arrangement for the same purpose; Fig. 6a represents a detail end view of a portion of the control apparatus;

Fig. 7 represents diagrammatically an alternative arrangement of the circuit shown in Fig. 6.

Fig. 8 represents a plan view of a modified form of chain grate;

Fig. 9 represents a longitudinal section along the line IX—IX of Fig. 8, looking in the direction of the arrows;

Fig. 10 represents a transverse section (longitudinally of an individual grate bar) along the line X—X of Fig. 9, looking in the direction of the arrows; and Fig. 11 represents a transverse section through an individual bar along the line XI—XI of Fig. 10, looking in the direction of the arrows.

Figure 1:
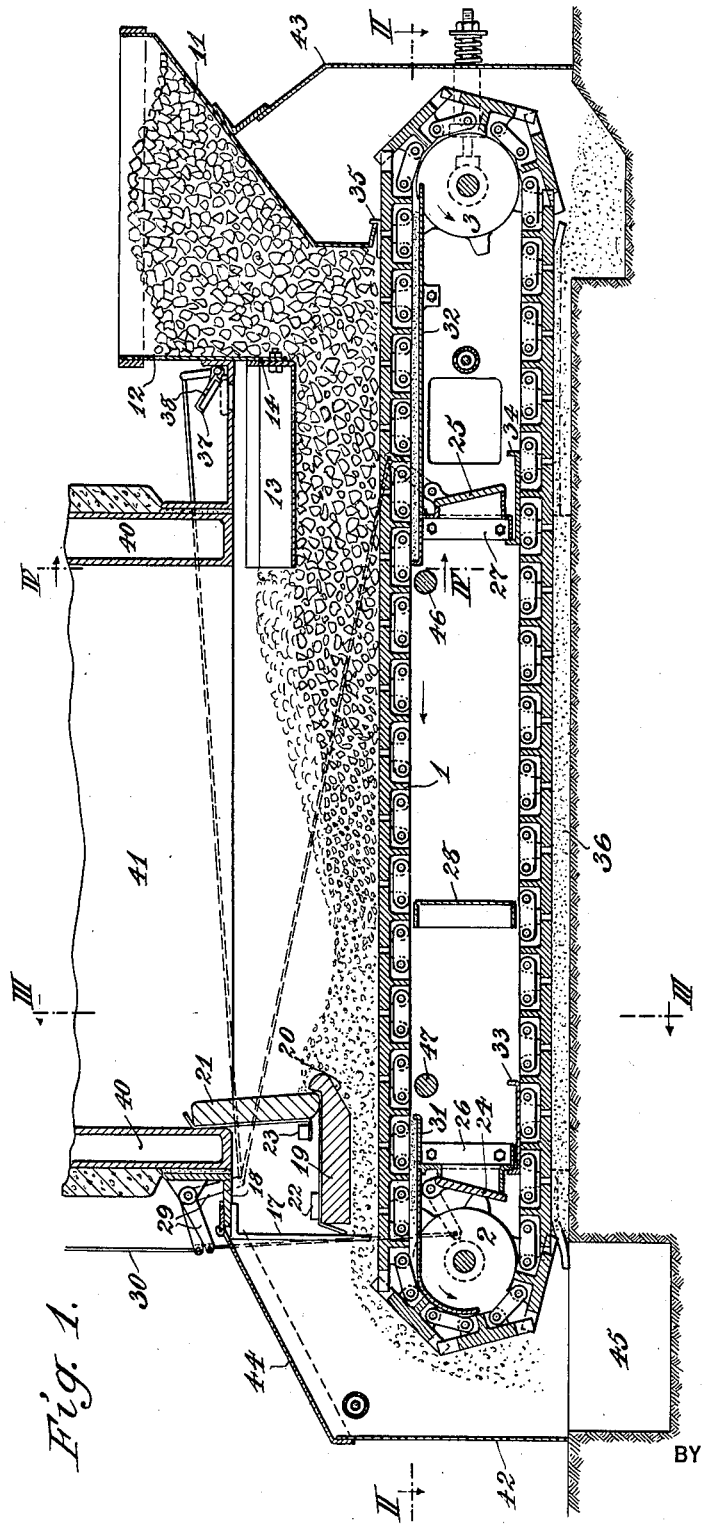
Figure 2:
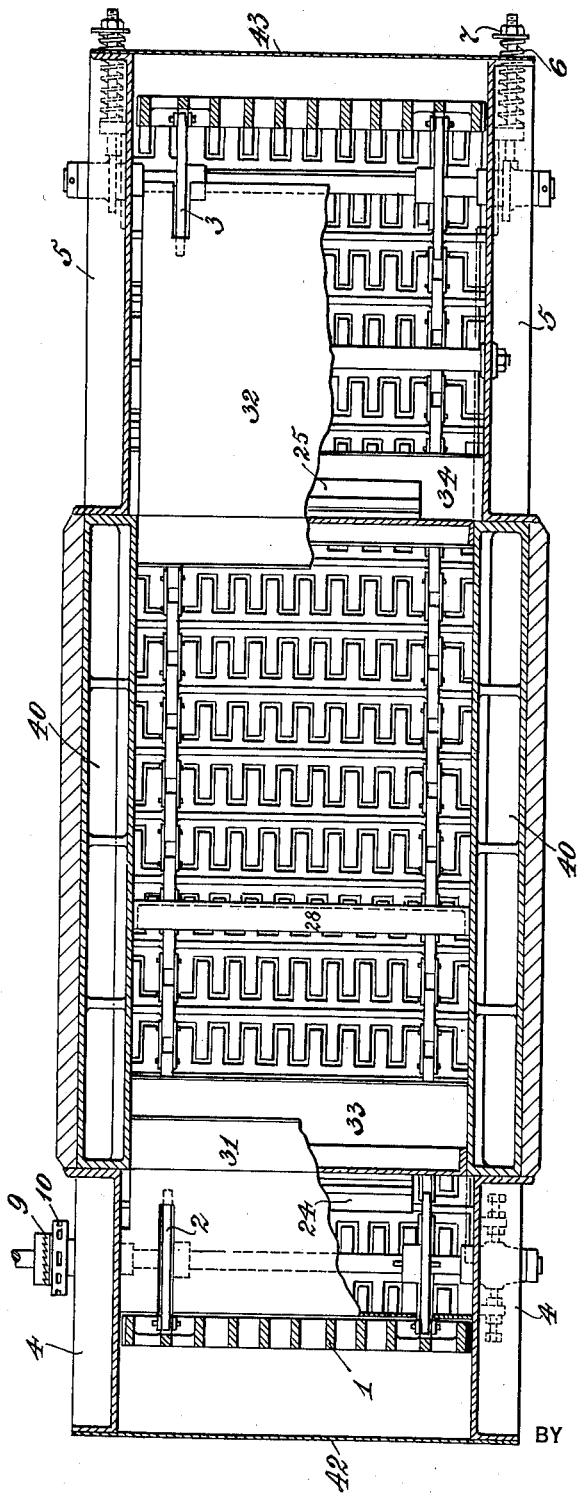
Fig. 2 represents a horizontal section taken along the line II—II of Fig. 1, looking in the direction of the arrows, parts being broken away.
Figure 3:
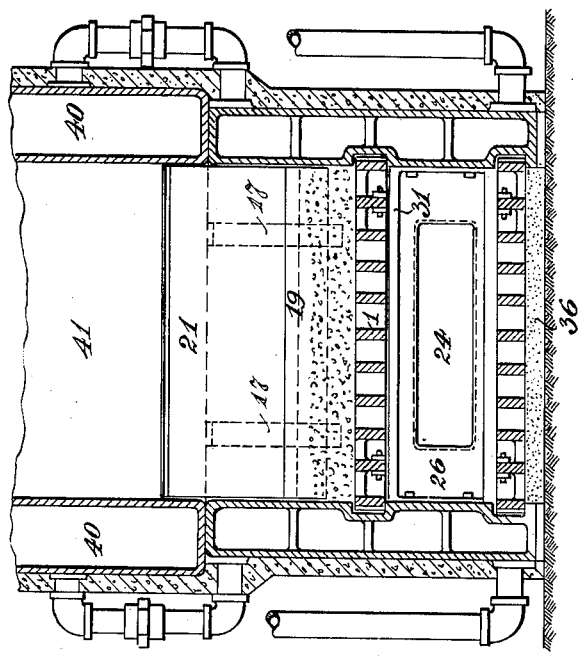
Fig. 3 represents a vertical transverse section taken along the line III—III of Fig. 1, looking in the direction of the arrows.

As shown in the drawings, a chain grate 1 is mounted in a manner readily understood upon sprockets 2, 3, or the like, which are suitably journaled in the side frames 4, 5 of a furnace. One of the sprockets may desirably be subjected to adjustable tension, as by means of springs 6 and tension nuts 7, or the like, in order to allow for contraction and expansion of the grate due to change in temperature or wear of the parts.

Driving means, such as a motor 8, is operatively connected by a clutch or coupling 9 with one of the sprockets. A windlass 10 may also be provided so that the grate may be operated by hand, if necessary.

Figure 4:
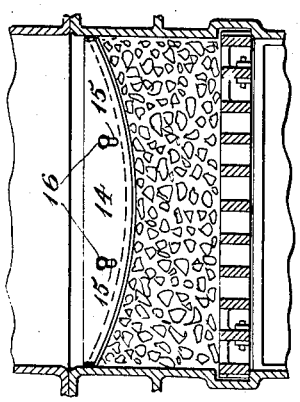
Fig. 4 represents a detail vertical transverse section taken along the line IV—IV of Fig. 1, looking in the direction of the arrows.

Above the supply end of the upper run of the grate is located a hopper 11, adapted to contain a quantity of coal, and this hopper opens at its base directly upon the traveling grate. The inner wall 12 of the hopper terminates at a distance from the top of the grate, and at the bottom of this wall is secured a plate 13, which extends for some distance in substantially the direction of travel of the fuel, or may be inclined slightly toward the grate, as indicated in Figs. 5 and 6. This plate 13 is provided with a flange 14 in which are formed slots 15 adapted to receive bolts 16 so as to permit vertical adjustment of the plate 13 with respect to the wall 12 of the hopper. It is found that air passes through the fuel bed more readily along its side edges than in its center area, hence the bottom edge of the wall 12 as well as the plate 13 may desirably be curved, as shown in Fig. 4, in order to give a concave form to the surface of the incoming fuel and thus equalize the resistance of the fire bed to the passage of air, ensuring uniformity of combustion throughout the fire bed.

Adjacent the discharge end of the grate 1, there are provided bars 17 secured to a portion of the back wall 18 of the furnace and projecting downwardly therefrom. A flat plate 19 having a beveled forward edge 20 is arranged to extend across the whole width of the grate, and to be retained in position by the bars 17. Above this plate 19, and resting upon it, is a similar plate 21, which is adapted to close the space between the plate 19 and the back wall 18 of the furnace. These plates 19 and 21 may desirably be formed of a suitable heat-resisting material and may be provided with counter-weights 22 and 23 respectively, in order to ensure their remaining in proper position. As clearly shown in Fig. 1, the plate 19 rides upon the ashes as they are very slowly moved thereunder by the motion of the grate 1, serving to level off and compress the ashes. This plate 19 additionally aids in producing practically perfect combustion of the fuel. It is known that in this type of stoker, for any given cross section of the fire bed, that portion of the fuel which contacts with the grate is, by reason of receiving the incoming air first, in a more advanced state of combustion than is the fuel directly above it at the surface of the fire bed; that is, the lower portions burn out before the upper portions. The weight of the plate 19 can be arranged so that it will sink into the fire bed far enough to permit passage under it only of the ashes. The fuel when completely burned is easily comminuted under the beveled forward edge 20 of the plate, and this portion of the material will thus be carried out under the plate, but the partially burned fuel which has greater resistance to crumbling will tend to be skimmed off and piled up around the nose of the plate until the hotter portion of the fire bed, which is brought forward by the motion of the grate, contacts with it and completes its combustion. When this is completed the remaining ash will be carried out as usual, in a continuous procedure according to the motion of the grate.

Between the upper and lower runs of the grate may be located suitable dampers 24, 25 supported in frames 26 and 27 respectively, for controlling the supply of air to the portion of the grate beneath the fire bed. A baffle 28 is located between these dampers and nearer the discharge end of the grate in order to distribute somewhat the supply of air. Thus, assuming that equal amounts of air enter through each of the dampers 24 and 25, it will be seen that there is a greater draft through the portion of the fire bed adjacent the discharge end of the grate than there is through the portion nearer the supply end thereof. The dampers 24, 25 may be operatively connected to the arms 29 of a bell crank, which in turn is adapted to be actuated by a connecting rod 30. In certain installations it may be found desirable to provide one or both of these dampers with adjustable auxiliary drafts in order to permit a controlled amount of air to enter when the dampers are closed.

In order to prevent the entrance of unwanted air through the various openings which necessarily exist around the grate and fire bed, air sealing devices are provided. Beneath the discharge end of the upper run of the grate is located a flat plate 31 which extends the full width of the grate housing and is set about one-half inch below the bottom of the grate bars. This plate 31 may have its forward edge slightly upturned, and may be extended in the line of travel of the grate part way around the curve at the discharge end thereof. Beneath the supply end of the grate is provided a flat plate 32 generally similar to the plate 31 and extending from a point approximately beneath the outer wall of the hopper 11 to a point slightly beyond the top of damper frame 27. Between the bottom of the frames 26, 27 and the top of the lower run of the grate are spaces which may be closed, as shown, by means of shoes 33, 34 having upturned edges, and adapted to ride freely upon the lower run of the grate while bearing also against the frames 26, 27. A similar shoe 35 may be arranged to close the space between the lower edge of the outer wall of the hopper 11 and the top run of the grate. In order that these various seals may be effective, it is desirable that a supply of fine material, such as sand, cinders, or ashes be provided, as clearly shown in Fig. 1. This fine material rests upon the plates 31, 32 and forms a yielding, adaptable and self-replenishing air seal. The material upon the plate 31 is continually renewed by ashes which sift through from the top of the grate; the material upon the plate 32 will naturally consist mainly of fine coal dust directly from the coal in the hopper 11.

In order to exclude unwanted air which might enter between the lower run of the grate and the floor upon which the stoker rests, there is provided a fine ash seal 36 similar to that on the plates 31, 32. The lower run of the grate may preferably be supported throughout its entire distance in order that the seal 36 may have a uniform height from end to end of the grate. It will be understood that in any of these seals where fine material is required a supply of sand, or the like, may be provided initially, and that thereafter the replacement will normally be entirely automatic. The bars making up the grate 1 may have any desired surface configuration, but it is important that they include a depending fin or web which extends continuously across the width of the grate, in order to make effective the air sealing means heretofore described.

It may be found that considerable air tends to enter through the supply of coal in the hopper, especially when the dampers 24, 25 are closed. The plate 13 is made long in the direction of travel of the fuel so as to increase the resistance to such unwanted air, and in order to decrease somewhat the draft which would cause its entrance, there is provided further a small damper 37 located between the hopper 11 and the fire bed, and arranged to admit air above the fire bed and above the plate 13 which covers the incoming coal. This damper 37 is connected to one of the arms 29 of the bell crank, so that when the dampers 24 and 25 are opened, the damper 37 closes, and vice versa. It may be desirable in some cases to provide the damper 37 with a small opening 38 so that some air may be admitted at all times, as an aid to complete combustion of the fuel. A check damper 39 (Figs. 5 and 6) may also be provided, and would normally be arranged to operate in synchronism with the damper 37.

If the stoker is installed in a hot water furnace, the latter will normally include suitable water jacket 40, surrounding as completely as may be desired a fire-box 41. Appropriate modification can be made when the furnace is of a type providing hot air or steam.

It will generally be desirable to enclose the ends of the grate, as by the dust covers 42 and 43, and the dust cover 42 at the discharge end of the grate may conveniently be surmounted by an inspection door 44 through which the ashes deposited in the ash pit 45 may be removed. Variations of this arrangement also may be made, depending upon the particular surroundings of any given installation.

Suitably located either above or below the grate 1 and as close as may be to the point where the coal supply enters the fire-box 41 is a heat operated switch 46, arranged in the operating circuit 47 of the motor 8, and adjusted so that it opens this circuit when the temperature falls below a predetermined point and closes the circuit when the temperature exceeds another predetermined point. Similarly located as close as may be to the point where the burned fuel passes out of the fire-box 41 toward the ash pit 45, is another similarly operated switch 48 also located in the operating circuit 47 of the motor 8 and adjusted to close the circuit when the temperature falls below a predetermined point which is considerably below the combustion point and to open the circuit when the temperature rises to a point which approaches the combustion point. It will be understood that the switches 46 and 48 are arranged in series with the motor 8 so that the latter cannot receive current except when both switches are closed. The connection between the motor 8 and clutch 9 includes suitable speed reduction means, such as gearing or the like, not shown, so that the speed with which the grate 1 is moved by the motor is only slightly greater than the speed with which ignition of the fuel at the supply end takes place.

In the operation of the apparatus just described, it will be seen that burning fuel cannot be conveyed out of the fire-box to the ash pit, because the heat of such fuel will cause the switch 48 to open, thereby stopping the motor 8. On the other hand, the point of ignition of fuel entering the fire-box cannot be moved too far away from the point of supply, since this would cause the lowering of the temperature sufficient to make the switch 46 open, thereby stopping the motor. In view of these limits it is clear that the actual net speed of the grate through the furnace cannot be greater than the speed with which the fuel ignites and maintains an adequate temperature in the vicinity of the switch 46. It will also be understood that, even when the temperature adjacent switch 46 is sufficient to close this switch, the motor will not move the grate until the fuel in the vicinity of switch 48 has been sufficiently consumed, so that the temperature can drop to the point required to close the switch 48. The actual zone of combustion of the fuel may be regarded as "floating" between the supply and discharge ends of the furnace.

When the demand for heat (as determined by the action of the dampers, hereinafter to be described) is at its maximum, the zone of combustion will occupy substantially the entire space between the supply and discharge ends of the grate. When the heat demand is low for a considerable period of time, the zone of combustion will decrease in area, the fuel gradually burning out from the discharge end toward the supply end, thus permitting the switch 48 to remain cool and closed when the switch 46 opens or closes according to the proximity of the zone of combustion. When the demand for heat then increases, the combustion will become more rapid and the switch 46 will be more frequently or more continuously closed, so that the area of combustion will increase as rapidly as the fresh coal at the supply end thereof can be ignited. When the area of combustion has been thus restored all the way to the discharge end of the grate, the temperature will be sufficient to open the switch 48 and hold the grate stationary as before described. From the foregoing it will be apparent that this fully automatic operation of the grate may continue so long as there is a supply of fuel and a supply of electric current.

The operation just described is particularly suitable in a heating plant when the demands for heat are infrequent or of short duration, such as in mild weather, but when the demands for heat require a more rapid response, as in very cold weather, the area of combustion can be made to decrease from the supply end instead of from the discharge end by closing a switch 49 which simply short-circuits the switch 46 and leaves the operation of the motor entirely under the control of the switch 48. In this case, the point of ignition of the fuel will progress toward the discharge end of the grate as the area of combustion decreases and as the forward motion of the grate brings fresh fuel into the fire-box. When there has been little demand for heat, the point of ignition will have moved some distance into the fire-box; then when a greater demand for heat is made, the fresh fuel already in the fire-box may be ignited as rapidly as necessary, producing the maximum fire in the minimum time quite independent of the motor 8. The opening or closing of the switch 49 is all that is required to select either of the foregoing methods for controlling the area of combustion.

From the foregoing it will readily be understood that the supplying of fuel, the removal of ash, and determination of the area of combustion is automatic and independent of the usual draft devices and external control means. Thus the fire will be maintained indefinitely, independent of an operator, and ready at all times to meet any heat demand which may be imposed upon it.

Demands for greater or less quantities of heat are made to cause a response in the opening or closing of appropriate dampers 24, 25, 37 and 39, all of these dampers being connected so as to work in synchronism as heretofore explained. This is indicated diagrammatically in Fig. 5 by the typical damper 50. In this figure the dampers, represented by 50, are operated by a motor 51, which is controlled from a room thermostat 52, so that when the room temperature falls below a predetermined point, the thermostat 52 causes the motor 51 to open the dampers 24, 25, at the same time closing the dampers 37, 39. Thus an ample draft is provided beneath the grate 1 and the combustion of the fuel is facilitated, the progress of the fuel through the fire-box 41 being determined as heretofore explained. When the room temperature has been raised sufficiently, the room thermostat 52 will act again, this time causing the motor 51 to close the dampers 24, 25, and to open the dampers 37, 39. The fire is thereby immediately checked, since the dampers 24, 25, together with the various air sealing means described, effectively prevent sufficient air from entering beneath the grate to support combustion of the fuel.

If this condition were to continue, it is apparent that the fire might be extinguished before another demand for heat causes a reopening of the lower dampers, hence it may be desirable to provide additional means for ensuring maintenance of the fire. In Fig. 6 the room thermostat 52 is shown operatively connected to a motor 53 which operates a double mercoid switch 54, this switch being arranged to control the operation of the damper motor 51. Switch 54 is arranged to make, in one position, the contacts which cause the damper motor 51 to open the dampers 24, 25 and close the dampers 37, 39; this switch 54 at the same time opens the power circuit of a motor 55 and stops the motor 51 from closing the dampers. Switch 54, in its other position, reverses its contact making and breaking operation, thereby providing power for the motor 55, allowing it to open and close the dampers in a regular sequence of operation, as determined by a timing drum 56 which operates another mercoid switch 57 adapted to control the operation of the damper motor 51. This last named switch 57 is arranged to select one of two circuits through which the damper motor 51 is caused either to open or close the dampers. The motor 55 drives a shaft 58, upon which is mounted a rotary switch 59 shunted across the gaps 60, 61 in the power circuit of the motor 55, the said rotary switch 59 having a small circuit breaking gap 62 so located that the timing drum 56 will always leave the switch 57 in the position to close the dampers; it being clear that the damper motor cannot, however, act to close the dampers if either or both of the gaps 60, 61 are open. The timing drum 56 is also mounted upon the shaft 58, driven by the motor 55, and this drum is formed with a longitudinally tapered face cam 63, as shown in detail in Fig. 6a; a pivoted arm 64 bears upon the drum 56 and is adapted to be raised by the cam 63 so as to operate the switch 57. The drum 56 is arranged to be revolved once in a selected unit of time (fifteen minutes, for instance), hence it will be seen that during a part of this revolution, the switch 57 will be in position to close the dampers and during the remainder of its revolution this switch will be in position to open the dampers. The motor 55 will drive the drum 56 continuously through its regular cycle until the power circuit is broken at the gaps 60 or 61, after which it will continue to drive the drum until the rotary switch 59 has reached a point where the gap 62 finally breaks the circuit and stops the motor 55. As before stated, this gap 62 is located so that the motor 55 and drum 56 are in a position such that the switch 57 causes the damper motor 51 to close the dampers. From this point the motor 55 cannot again start until both the gaps 60 and 61 are closed.

The gap 61 may be closed by a switch 65 controlled by heat variations in the top of the firebox, as shown in Fig. 6, or by a heat responsive element located in the flue leading from the firebox, as shown in Fig. 7. Referring particularly to the arrangement shown in Fig. 6, it will be seen that the switch 65 is made to close the gap 61 when the temperature is relatively low. This will cause the motor 55 to operate, provided the gap 60 is also closed, and the gap 60 will be closed only when the room thermostat 52 is not requiring additional heat. When the motor 55 starts, the dampers will soon be opened in accordance with the program determined by the timing drum 56, and air will be supplied to the fire for the few minutes necessary to ensure the fire against being extinguished.

From the foregoing it will be seen that when no heat demand is being made on the furnace, the motor 55 and drum 56 will carry on a program of intermittent air supply to the fire sufficient to keep it alive until the next heat demand is made. It is also clear that the switch 65 will prevent the program from going into effect until the fire has died down enough to require air to save it from extinction; thus the switch 65 becomes a means of delaying the program until it is really needed. In case the switch 57 causes the damper motor to permit more air than is required to enter the furnace, thus providing too great activity of the fire, the extra heat will cause the switch 65 to open and thus stop the program in a closed damper position as soon as the rotary switch 59 breaks the circuit at the gap 62. The program cannot then be resumed until the fire cools down sufficiently to cause switch 65 to operate as above described. The effect of causing temporarily too much activity of the fire is simply to lengthen the cycle of operation, so that the fire actually gets additional air only when it is required and is prevented from receiving it when it is not required. The switch 65 thus becomes a means of saving fuel by preventing unnecessary activity of the fire when little or no demand for heat is being made.

In operation, it will be seen that when the room thermostat 52 demands a greater supply of heat, the motor 53 will move the switch 54 to its position where the gap 66 will be opened in the damper closing circuit, and the gap 67 will be closed so as to cause the damper motor 51 to open the dampers. So long as the demand for heat continues, there will be no further changes in the circuit, since in this position the gap 60 is also opened and the program mechanism is not in operation.

When the stoker control mechanism herein described is applied to a pressure vessel, provision may be made for closing the dampers, when necessary, by means of a pressure actuated arm 68 in the usual manner, so that in this way the desired pressure may be produced and maintained throughout the demand for heat, whether it be long or short.

When sufficient heat has been supplied to satisfy the demand made by the room thermostat 52, the switch 54 will be returned to its damper closing position, breaking the circuit at the gap 67 and closing the circuit at gap 66 as well as closing gap 60 in the operating circuit of motor 55. The maintenance of a low fire will then be assured by the program operation heretofore set forth. In some installations it might be found desirable to eliminate the program apparatus and connect the switch 65 so as to operate the switch 57. In this case the cooling off of the fire would cause the switches 65 and 57 to operate motor 51 for opening the dampers, and an increase in the fire temperature would have the opposite effect; thus the fire itself would determine the amounts of air required to keep it alive, without the use of mechanical or electrical timing or program devices.

When the method of stoker control herein described is used in connection with the heating of dwellings, a saving of fuel and more satisfactory heating conditions may be effected by the use of an outdoor thermostat 69 operating a motor 70 which moves a pivoted arm 71 connected to a collar 72 on the end of the drum 56. The drum 56 has its raised cam portion 63 arranged so that, toward one end of the drum, it will provide a damper opening of rather short duration and at the other end a damper opening of much longer duration. The drum 56 is movable longitudinally by the arm 71 so that the portion of its face engaging operatively with the arm 64 may be changed in accordance with the length of damper opening desired. Thus, when the outdoor thermostat 69 indicates a low temperature, it will cause the motor 70 to operate arm 71 and move the drum 56 into position to give the dampers a longer opening; again, when the outside temperature is warmer, the drum 56 may be moved correspondingly so that the dampers will be opened for a relatively shorter length of time.

In place of motor 53, cam 63 and the mercoid switches 54 and 57 various other devices may be used. In Fig. 7 is shown an alternative arrangement for accomplishing the results heretofore described in a similar manner, but by means of solenoids and magnetic switches. In this figure a room thermostat 73 is arranged to operate a solenoid circuit 74 which, in turn, operates a triple magnetic switch 75. When the thermostat 73 demands heat, it causes the solenoid 74 to move switch 75 into its upper position closing the circuit 76 which operates damper motor 51 to open the dampers. At the same time the switch 75 breaks the circuit 77 and prevents the damper motor 51 from closing the dampers. When the heat demand has been satisfied, the thermostat 73 permits the switch 75 to resume its lower position and again close the dampers. In this latter position, i. e., when no heat demand is being made, the switch 75 also closes the circuit 78 which is connected to a program device 79 in all respects similar to that heretofore described, except that, instead of the cam 63, there is provided a surface contact portion 80 which determines the operation of a solenoid 81 connected to magnetic switch 82, by completing or breaking the circuit between the contacts or brushes 85. The switch 82 is adapted to close the circuits 76 or 77 of the damper motor 51 in order to open and close the dampers in accordance with the program called for by the program device 79. When the fire cools down to a certain predetermined point, the switch 83 (corresponding to switch 65 in Fig. 6) causes the program device 79 to operate, thus opening and closing dampers in a regular cycle of operation until the heat in the flue 84 becomes sufficient to reverse the action of switch 83 and stop the action of the program device 79.

In this alternative arrangement it will be seen that the outside thermostat 69, the motor 70, arm 71 and collar 72 are used exactly as heretofore described.

In Figs. 8, 9, 10 and 11 is shown a modified form of grate which comprises a series of grate bars 86, shaped at their ends to fit over alternate links of a flat chain 87. A projection 88 in each end of each bar fits within the link and terminates slightly above the plane of the flanges 89, and in the upper surface of the bar, above the projection 88, is a depressed portion 90 between apertures 91. In securing the bar to the chain a U-shaped clip 92 having lateral projections 93 is applied beneath the chain and the bar is placed above the chain with the ends of the clip 92 passing through the apertures 91. The thickness of the clip at its bottom fills the space between the end of the projection 88 and the plane of the flanges 89, while the upper ends of the clip may be bent over, as shown in Figs. 8 and 9, to substantially fill the depressed portion 90 at the top of the bar. From this it will be seen that bars of this type may readily be removed and replaced individually, and that they fit over the chain 87 so as to protect it very largely from the hottest part of the fire, while at the same time providing, together with the clips 92, a substantially plane and continuous upper and lower surface in connection with which very effective air sealing means may be provided.

The operation of the various parts of the mechanism herein described has been set forth in connection with the description of each portion of the apparatus, hence it seems unnecessary to state at any greater length the manner of operation of this device.

It is evident that various changes may be resorted to in the form, construction and arrangement of the several parts without departing from the spirit and scope of our invention, and hence we do not intend to be limited to the details herein shown and described, except as they may be included in the claims.

What we claim is:

1. An apparatus of the character described comprising, a grate, means for moving the grate, and heat-controlled means adjacent each end of the grate for actuating the grate moving means.

2. An apparatus of the character described comprising, a chain grate, means for moving the grate, and heat-controlled means adjacent each end of the grate for actuating the grate moving means.

3. An apparatus of the character described comprising, a grate, means for moving the grate, heat-controlled means adjacent the supply end of the grate adjusted to assume a grate-moving condition upon an increase in temperature and a grate-stopping condition upon a decrease in temperature, and heat-controlled means adjacent the discharge end of the grate adjusted to assume a grate-moving condition upon a decrease in temperature and a grate-stopping condition upon an increase in temperature, said heat-controlled means being cooperatively associated to move the grate only when both are in grate-moving condition and to stop the grate when either is in grate-stopping condition, whereby the burning portion of the fire-bed may be made to float between the ends of the grate and prevented from passing either end.

4. An apparatus of the character described comprising, a grate, a motor for moving the grate, an electric circuit for controlling the actuation of the motor, heat-controlled means adjacent the supply end of the grate adjusted to close a gap in said circuit upon an increase in temperature and to open said gap upon a decrease in temperature, and heat-controlled means adjacent the discharge end of the grate adjusted to close another gap in the circuit upon a decrease in temperature and to open said other gap upon an increase in temperature, said gaps being arranged in series so that the motor can operate only when both are closed and cannot operate when either is open, whereby the burning portion of the fire-bed may be made to float between the ends of the grate and prevented from passing either end.

5. An apparatus of the character described comprising, a grate, a motor for moving the grate, an electric circuit for controlling the actuation of the motor, heat-controlled means adjacent the supply end of the grate adjusted to close a gap in said circuit upon an increase in temperature and to open said gap upon a decrease in temperature, heat-controlled means adjacent the discharge end of the grate adjusted to close another gap in the circuit upon a decrease in temperature and to open said other gap upon an increase in temperature, said gaps being arranged in series so that the motor can operate only when both are closed and cannot operate when either is open, and means for making inoperative the heat-controlled means adjacent the supply end of the grate, whereby the position of the burning portion of the fire-bed may be determined solely by the heat-controlled means adjacent the discharge end of the grate.

6. In a furnace having dampers controlling the supply of air to the fuel, a grate, means for moving the grate, heat-controlled means adjacent each end of the grate for actuating the grate moving means in accordance with the position of the fire-bed, and damper operating means including a thermostat responsive to the heat demands of the space to be heated and a damper motor operatively connected to said thermostat.

7. In a furnace having dampers controlling the supply of air to the fuel, a grate, a motor for moving the grate, an electric circuit for controlling the actuation of the motor, heat-controlled means adjacent the supply end of the grate adjusted to close a gap in said circuit upon an increase in temperature and to open said gap upon a decrease in temperature, heat-controlled means adjacent the discharge end of the grate adjusted to close another gap in the circuit upon a decrease in temperature and to open said other gap upon an increase in temperature, said gaps being arranged in series so that the motor can operate only when both are closed and cannot operate when either is open, whereby the burning portion of the fire-bed may be made to float between the ends of the grate and prevented from passing either end, and damper operating means including a thermostat responsive to the heat demands of the space to be heated and a damper motor operatively connected to said thermostat.

8. In a furnace having dampers controlling the supply of air to the fuel, a grate, means for moving the grate, heat-controlled means adjacent each end of the grate for actuating the grate moving means in accordance with the position of the fire-bed, and damper operating means including a thermostat responsive to the heat demands of the space to be heated, a damper motor and a switch operatively connected to said thermostat for controlling the said motor.

9. In a furnace having dampers controlling the supply of air to the fuel, a grate, a motor for moving the grate, an electric circuit for controlling the actuation of the motor, heat-controlled means adjacent the supply end of the grate adjusted to close a gap in said circuit upon an increase in temperature and to open said gap upon a decrease in temperature, heat-controlled means adjacent the discharge end of the grate adjusted to close another gap in the circuit upon a decrease in temperature and to open said other gap upon an increase in temperature, said gaps being arranged in series so that the motor can operate only when both are closed and cannot operate when either is open, whereby the burning portion of the fire-bed may be made to float between the ends of the grate and prevented from passing either end, and damper operating means including a thermostat responsive to the heat demands of the space to be heated, a damper motor and a switch operatively connected to said thermostat for controlling the said motor.

10. In a furnace having dampers controlling the supply of air to the fuel, a grate, means for moving the grate, heat-controlled means adjacent each end of the grate for actuating the grate moving means in accordance with the position of the fire-bed, and damper operating means including a thermostat responsive to the heat demands of the space to be heated, a damper motor, a switch operatively connected to said thermostat for controlling the said motor and automatic means normally operative to control said motor when no heat demand is made.

11. In a furnace having dampers controlling the supply of air to the fuel, a grate, a motor for moving the grate, an electric circuit for controlling the actuation of the motor, heat-controlled means adjacent the supply end of the grate adjusted to close a gap in said circuit upon an increase in temperature and to open said gap upon a decrease in temperature, heat-controlled means adjacent the discharge end of the grate adjusted to close another gap in the circuit upon a decrease in temperature and to open said other gap upon an increase in temperature, said gaps being arranged in series so that the motor can operate only when both are closed and cannot operate when either is open, whereby the burning portion of the fire-bed may be made to float between the ends of the grate and prevented from passing either end, and damper operating means including a thermostat responsive to the heat demands of the space to be heated, a damper motor, a switch operatively connected to said thermostat for controlling the said motor and automatic means normally operative to control said motor when no heat demand is made.

12. In a furnace having dampers controlling the supply of air to the fuel, a grate, means for moving the grate, means controlled entirely by the condition of the fire-bed for determining the actuation of the grate moving means, and damper operating means including a thermostat responsive to the heat demands of the space to be heated and automatic means operable to supply a minimum necessary draft for maintaining combustion when no heat demand is made.

13. In a furnace having dampers controlling the supply of air to the fuel, a grate, means for moving the grate, means controlled entirely by the condition of the fire-bed for determining the actuation of the grate moving means, and damper operating means including a thermostat responsive to the heat demands of the space to be heated, automatic means operable to supply a minimum necessary draft for maintaining combustion when no heat demand is made, and heat-controlled means above the fire-bed for preventing unnecessary activity of said automatic means.

14. In a furnace having dampers controlling the supply of air to the fuel, a grate, means for moving the grate, means controlled entirely by the condition of the fire-bed for determining the actuation of the grate moving means, and damper operating means including a thermostat responsive to the heat demands of the space to be heated, an electrically operated program device operable to open and close dampers in a regular time sequence, a switch for closing a gap in the operating circuit of said device so long as the thermostat makes no heat demand and a switch for opening a gap in said operating circuit so long as the fire-bed gives off more than a minimum amount of heat.

15. An apparatus of the character described comprising, a grate, means for moving fuel through a fire-box on said grate, and heat-controlled means adjacent each end of the grate for actuating the fuel moving means.

16. An apparatus of the character described comprising, a grate, means for moving fuel through a fire-box on said grate, heat-controlled means adjacent the supply end of the grate adjusted to assume a fuel-moving condition upon an increase in temperature and a non-fuel-moving condition upon a decrease in temperature, and heat-controlled means adjacent the discharge end of the grate adjusted to assume a fuel-moving condition upon a decrease in temperature and a non-fuel-moving condition upon an increase in temperature, said heat-controlled means being cooperatively associated to move the fuel only when both are in fuel-moving condition and not to move the fuel when either is in non-fuel-moving condition, whereby the heat producing portion of the fire-bed may be made to float between the ends of the grate and prevented from passing either end.

17. In a furnace having dampers controlling the supply of air to the fuel, a grate, means for moving fuel through a fire-box on said grate, heat-controlled means adjacent each end of the grate for actuating the fuel-moving means in accordance with the position of the fire-bed, and damper operating means including a thermostat responsive to the heat demands of the space to be heated and a damper motor operatively connected to said thermostat.

18. In a furnace having dampers controlling the supply of air to the fuel, a grate, means for moving fuel through a fire-box on said grate, heat-controlled means adjacent each end of the grate for actuating the fuel-moving means in accordance with the position of the fire-bed, and damper operating means including a thermostat responsive to the heat demands of the space to be heated, a damper motor and a switch operatively connected to said thermostat for controlling the said motor.

19. In a furnace having dampers controlling the supply of air to the fuel, a grate, means for moving fuel through a fire-box on said grate, heat-controlled means adjacent each end of the grate for actuating the fuel-moving means in accordance with the position of the fire-bed, and damper operating means including a thermostat responsive to the heat demands of the space to be heated, a damper motor, a switch operatively connected to said thermostat for controlling the said motor, and automatic means normally operative to control said motor when no heat demand is made.

20. In a furnace having dampers controlling the supply of air to the fuel, a grate, means for moving fuel through a fire-box on said grate, means controlled entirely by the condition of the fire-bed for determining the actuation of the fuel-moving means, and damper operating means including a thermostat responsive to the heat demands of the space to be heated and automatic means operable to supply a minimum necessary draft for maintaining combustion when no heat demand is made.

21. In a furnace having dampers controlling the supply of air to the fuel, a grate, means for moving fuel through a fire-box on said grate, means controlled entirely by the condition of the fire-bed for determining the actuation of the fuel-moving means, and damper operating means including a thermostat responsive to the heat demands of the space to be heated, an electrically operated program device operable to open and close dampers in a regular time sequence, a switch for closing a gap in the operative circuit of said device so long as the thermostat makes no heat demand, and a switch for opening a gap in said operating circuit so long as the fire-bed gives off more than a minimum amount of heat.

THOMAS V. STANDIFER.
ROBERT L. HATFIELD.